(12) United States Patent
Frick et al.

(10) Patent No.: US 7,113,088 B2
(45) Date of Patent: Sep. 26, 2006

(54) RFID ACTIVATED INFORMATION KIOSK

(75) Inventors: Oliver Frick, Karlsruhe (DE); Uwe Kubach, Waldbronn (DE); Joachim Schaper, Landau/Pfalz (DE)

(73) Assignee: SAP AG, Walldorf ( * ) Notice: Subject to any disclaimer, the term of this patent is extended or adjusted under 35 U.S.C. 154(b) by 66 days.

(21) Appl. No.: 10/651,302

(22) Filed: Aug. 29, 2003

(65) Prior Publication Data
US 2004/0089709 A1 May 13, 2004

Related U.S. Application Data

(60) Provisional application No. 60/406,926, filed on Aug. 30, 2002.

(51) Int. Cl.
*G08B 1/08* (2006.01)
*H04Q 7/00* (2006.01)

(52) U.S. Cl. .............................. 340/539.11; 340/573.1

(58) Field of Classification Search ........... 340/539.11, 340/573.1, 572.1, 572.7; 455/414
See application file for complete search history.

(56) References Cited

U.S. PATENT DOCUMENTS

| | | | | |
|---|---|---|---|---|
| 6,078,928 A | * | 6/2000 | Schnase et al. | 707/104.1 |
| 6,366,879 B1 | * | 4/2002 | Coxhead et al. | 704/201 |
| 6,657,543 B1 | * | 12/2003 | Chung | 340/573.1 |
| 6,804,330 B1 | * | 10/2004 | Jones et al. | 379/88.01 |
| 2002/0082859 A1 | * | 6/2002 | Lancos et al. | 705/1 |

OTHER PUBLICATIONS

Grasso, Antonietta, et al., "Augmenting Paper to Enhance Community Information Sharing," *Designing Augmented Reality Environments*, 2000: 51-62.*

Kindberg, Tim, "Implementing Physical Hyperlinks Using Ubiquitous Identifier Resolution," *WWW2002*, May 7-11, 2002, Honolulu, Hawaii, USA, pp. 191-199.*

Ljungstrand, Peter, "WebStickers: Using Physical Tokens to Access, Manage and Share Bookmarks to the Web," Proceedings of DARE 2000 (Designing Augmented Reality Environments), Elsinore, Denmark Apr. 12-14, 2000, retrieved from the Internet at http://www.viktoria.se/fal/publications/play/2000/webstickers-DARE2000.pdf, pp. 23-31.*

Ross, David A., et al., "Development of a Wearable Computer Orientation System," *Personal and Ubiquitous Computing*, (2002) 6:49-63.*

Ross, David A., et al., "Wearable Interfaces for Orientation and Wayfinding," ASSETS'00, Nov. 13-15, 2000, Arlington, Virginia, USA, retrieved from the Internet at http://www.cc.gatech.edu/classes/AY2003/cs4803h_spring/readings/ross-wayfinding.pdf, pp. 193-200.*

(Continued)

*Primary Examiner*—John Tweel, Jr.
(74) *Attorney, Agent, or Firm*—Fish & Richardson, P.C.

(57) ABSTRACT

An information kiosk including a display, such as, for example, a touch screen, and having access to situational information is integrated with a radio frequency identification (RFID) sensor. The RFID sensor reads the RFID tag of a user, accesses user information corresponding to the RFID tag, and customizes an interface to the user based on the user information and the situational information. The interface is then output to the user using the display of the information kiosk. The information kiosk may communicate with a private branch exchange (PBX) switch to permit use of a contact information center (CIC) or a voice portal. The user information may be stored as a user profile in a Customer Relationship Management (CRM) system, accessed by the information kiosk. By combining the user information with event or location information stored in the information kiosk, the information kiosk presents customized information to each user, including maps, directions, and recommended sites or events.

18 Claims, 4 Drawing Sheets

OTHER PUBLICATIONS

Wan, Dadong, "Magic Home: Exploiting the Duality Between the Physical and the Virtual Worlds," Second International Symposium on Handheld and Ubiquitous Computing (HUC 2000), Sep. 25-27, 2000, Bristol, UK, retrieved from the Internet at http://www.accenture.com/xdoc/en/services/technology/publications/MagicHome-CHI2000.pdf, pp. 53-54.*

* cited by examiner

RFID ACTIVATED INFORMATION KIOSK

CROSS-REFERENCE TO RELATED APPLICATIONS

This application claims priority from U.S. Provisional Application No. 60/406,926, filed Aug. 30, 2002, and titled RFID ACTIVATED INFORMATION KIOSK.

TECHNICAL FIELD

This disclosure relates to an information kiosk system.

BACKGROUND

Information kiosks have been used to assist in orienting people to new places or to provide information regarding scheduled events. Kiosks may be found in tourist locations (e.g., airports, highway rest areas, hotels), university campuses, and conference facilities. These kiosks typically allow a user to view information such as, for example, maps, tourist attractions, and nearby restaurants.

Kiosks assist in orienting users by providing location and schedule information. For example, at a conference, a conference attendee may approach a kiosk and select to view the schedule of the day's events. At a large conference, many events may be scheduled simultaneously. The attendee views the list to determine the desired events to attend, as well as their locations and times. Some conferences assist attendees by categorizing events into tracks of events that appeal to a particular category of people to make it easier for an attendee to determine how best to use his or her time.

Large conferences have begun to rely on computer-readable badges to identify attendees. The badge may include a barcode or a magnetic strip to allow badge readers to determine whom the attendee is and what privileges they have purchased. The badges are used at entrances to the conference to ensure each person has paid to participate, as well as, at various booths throughout the conference so that vendors may collect information electronically about attendees interested in their products.

SUMMARY

In one aspect, a radio frequency identification (RFID) tag of a user is read by an RFID sensor integrated with an information kiosk having access to situational information. User information corresponding to the RFID tag is accessed, an interface is generated to the user based on the user information and the situational information, and the interface is output to the user using the information kiosk.

Implementations may include one or more of the following features. For example, user information may be accessed by communicating with a Customer Relationship Management (CRM) system to obtain a user profile.

The user profile may be built by presenting a series of questions to the user via the information kiosk. User profiles may be uploaded to the CRM system from an attendee registration system.

The situational information may include location information and event information and the interface may be generated by building a user agenda providing directions and event descriptions that are customized to the user.

At least a portion of the interface may be output to a mobile device, such as, for example, a mobile telephone or a personal digital assistant (PDA). The interface which is output may be a voice-enabled interface.

In another aspect, an information kiosk includes a display having access to situational information and user-specific information, and an RFID sensor is integrated with the information kiosk and is operable to read an RFID tag associated with a user. The information kiosk is operable to identify the user based on reading the RFID tag, and is further operable to generate an interface customized to the user for presentation on the display, based on the situational information and the user-specific information.

Implementations may include one or more of the following features. For example, the display may be a touch screen.

The information kiosk may further comprise a CRM system operable to store the user-specific information, such as, for example, in the form of user profiles. The user profiles may be built by presenting a series of questions to the user via the kiosk. The user profiles already in the CRM system may have been uploaded from an attendee registration system. The attendee registration system may be implemented as a web-based application that allows users to register electronically on an internet.

The information kiosk may be further operable to communicate with the CRM system via a private exchange (PBX) switch. The information kiosk may access the PBX switch in conjunction with accessing a contact information center (CIC) or in conjunction with accessing a voice portal operable to implement voice recognition.

The details of one or more implementations of the invention are set forth in the accompanying drawings and the description below. Other features, objects, and advantages of the invention will be apparent from the description and drawings, and from the claims.

DETAILED DESCRIPTION

Figure 1:
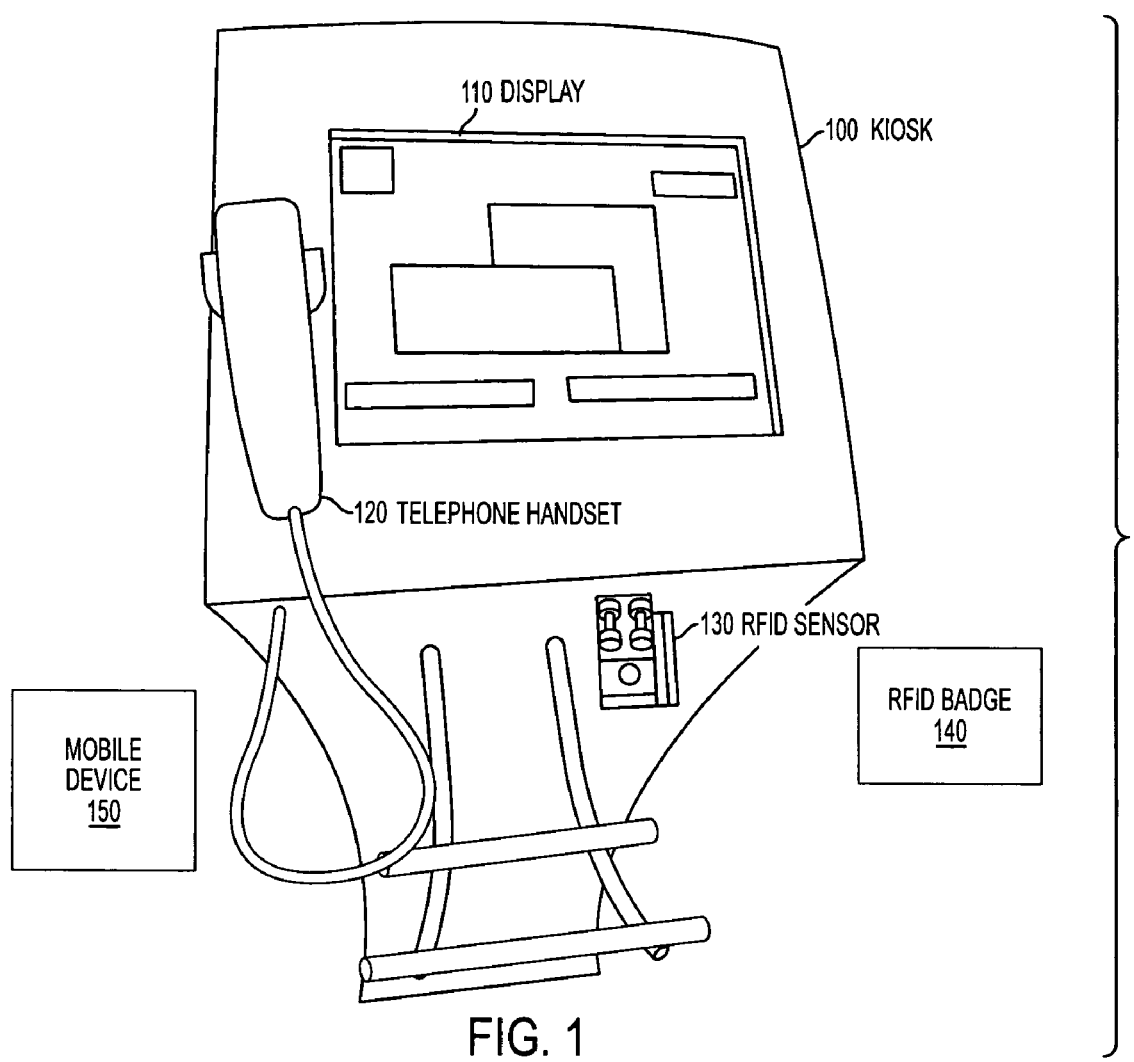
FIG. 1 is an illustration of an information kiosk using radio frequency identification (RFID) to identify users.

FIG. 1 is an illustration of an information kiosk 100 using radio frequency identification (RFID) to identify users. The information kiosk 100 includes a touch screen display 110, a telephone handset 120, and an RFID sensor 130 configured to read a RFID tag associated with a badge 140 carried by a tradeshow visitor. The information kiosk 100 is generally supported on a base such that a user standing directly in front of the information kiosk 100 can easily access the touch screen display 110. In one implementation, multiple information kiosks 100 may be distributed throughout the demonstration space of a large convention center during a tradeshow and may communicate with various backend systems via a network.

The information kiosk 100 supports a variety of user interface applications. In one implementation, an interface application is customized by the tradeshow sponsor and provides access to content particular to that tradeshow. This content may include, for example, an interactive map of booth locations, various demonstrations occurring throughout the convention center, a schedule of each day's classes, presentations, and events, and information about specific products on display at the tradeshow. The content may be stored locally in a memory of the kiosk, or may be stored remotely and accessed by the kiosk using a network connection.

In an implementation described below, the interface application includes a customer relationship management (CRM) survey application presented to visitors at the tradeshow. The CRM survey application may be used to pose a series of questions, and based upon the answers provided, suggest a schedule of events that may be most interesting to the visitor. Directions to each event can be provided to the visitor, perhaps by displaying a map or floor plan of the convention center.

In another interface application, the information kiosk 100 may display a screen in which the visitor enters a request for specific information, along with their personal mobile telephone number. The request for additional information may then be processed by either a manual or automated information processing system. The requested information may then be provided using a variety of communication techniques, such as, for example, email, short messaging service (SMS), or a direct phone call from a customer service representative.

In another implementation, the interface application may function as an agenda builder in which the visitor builds their agenda according to date, conference track, specific industry solution, or industry sector. Notification for the start of each session may be sent to the visitor by way of an SMS message. Alternatively, information may be sent to a mobile device 150, for example, a personal digital assistant (PDA) or computing device through an optional wireless, infrared, or Bluetooth port.

Figure 2A:
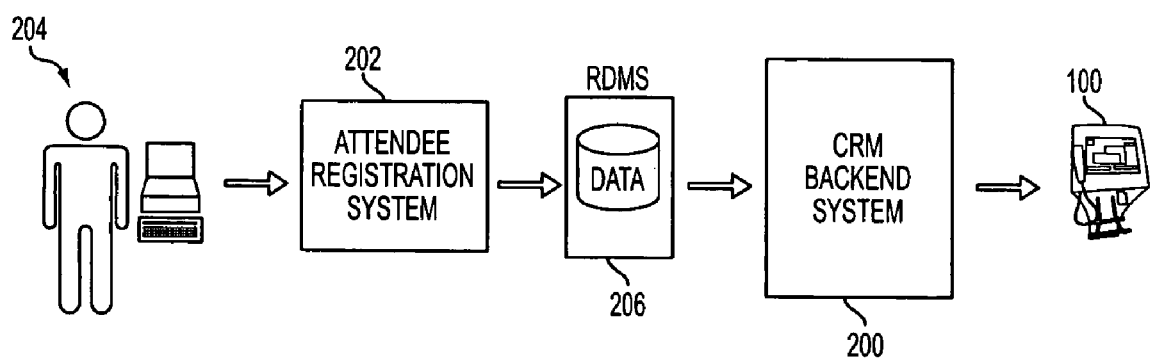
FIG. 2A is a block diagram of a customer relationship management (CRM) system used with the information kiosk of FIG. 1.

FIG. 2A is a block diagram of a customer relationship management (CRM) backend system 200, such as, for example, an SAP R/3 system, used with the information kiosk of FIG. 1. The CRM backend system 200 stores a variety of customer information including information about the customers and information that can be provided to customers.

In the implementation of FIG. 2A, information from a conference attendee registration system 202 is uploaded into the CRM backend system 200. The attendee registration system 202 may be implemented as a web-based application that allows users 204 to register for the conference electronically using an internet connection. The attendee registration system 202 updates a database, such as, for example, a relational database management system (RDBMS) 206, with conference attendee information and accepts any required payments. The customer information in the RDBMS 206 is used to populate the CRM backend system 200 that may already include information about, for example, attendees, presenters, conference events, and other conference-related information.

In operation, the user 204 (e.g. conference attendee or visitor) approaches the information kiosk 100 located at the conference and places their RFID badge 140 near the RFID sensor 130 so that their unique ID can be read from the badge. The application running on the information kiosk 100 accesses the visitor's personal information profile from the CRM backend system 200. The personal information profile from the CRM backend system 200 may be used to authenticate that the user 204 is a registered attendee, authorized to use the system.

Using the display 110, which may be implemented using a conventional touch screen display panel, the user 204 may choose a variety of options allowing communication and information retrieval. For example, the user 204 may choose to send a message, such as, for example, an email or an SMS message, to a friend or colleague. The display 110 also may be used to access web based information from the internet by typing in the URL using a keyboard displayed on the touch screen.

Figure 2B:
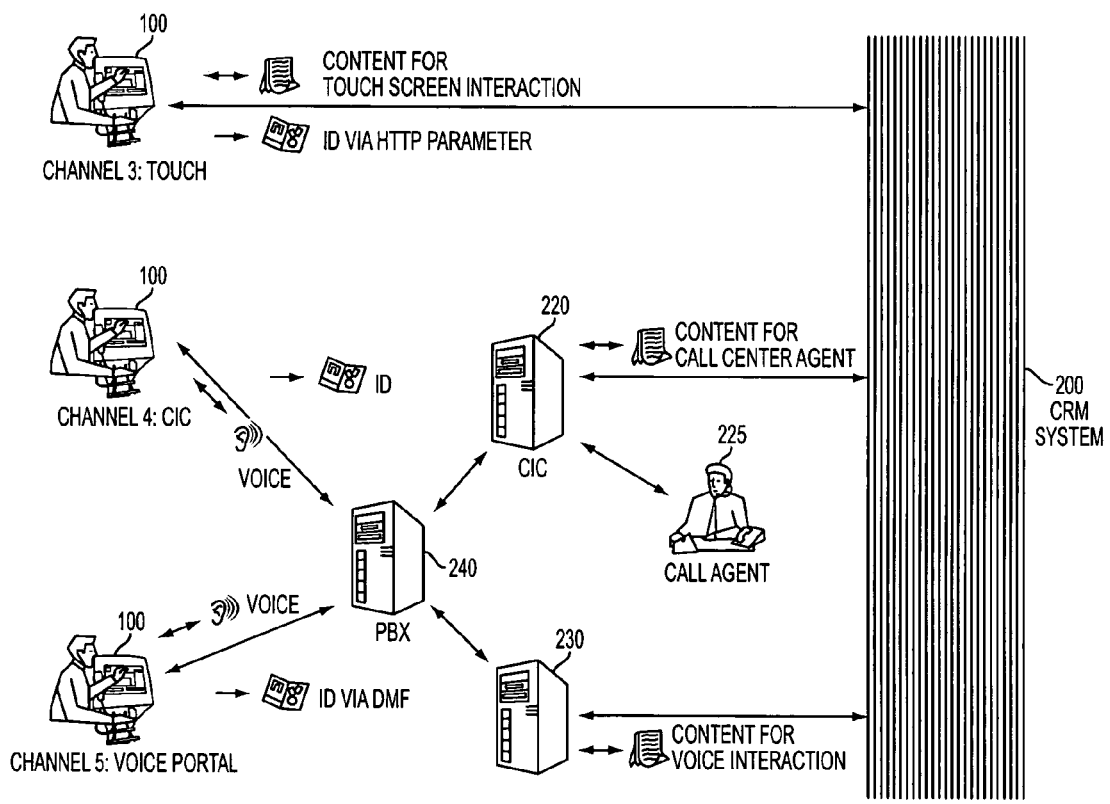
FIG. 2B is a block diagram of systems for interacting with the information kiosk of FIG. 1.

Additionally, referring to FIG. 2B, the system provides a variety of communication techniques to assist the user 204 in accessing the conference's offerings. For example, the kiosk 100 can display information about conference events, presentations, and talks. The kiosk 100 also may show maps and describe exhibitors' products. Additionally, the system can provide a voice-enabled user interface to increase accessibility for conference participants.

The kiosk 100 also allows users to interact verbally using the handset 120. For audio information, the system uses a private branch exchange ("PBX") switch 240 to connect users to a contact information center ("CIC") 220 or a voice portal 230. A voice-enabled user interface allows users to interact using handset 120 to listen to voice prompts, listen to audio information, and to interact with the kiosk 100. Any microphone and speaker system may be used; however, the telephone handset 120 is useful in loud, crowded conference facilities.

In some implementations, the user 204 may speak directly with a call agent associated with the CIC 220, which is in turn connected to the CRM backend system 200. The call agent uses the CRM backend system 200 to retrieve the user's information and various conference information that may be presented audibly, or through the display 110. The user also may communicate with the CRM backend system 200 by way of a voice portal 230 that implements voice recognition in order to translate spoken requests into search requests for retrieving specific information from the CRM backend system 200.

Figure 3:
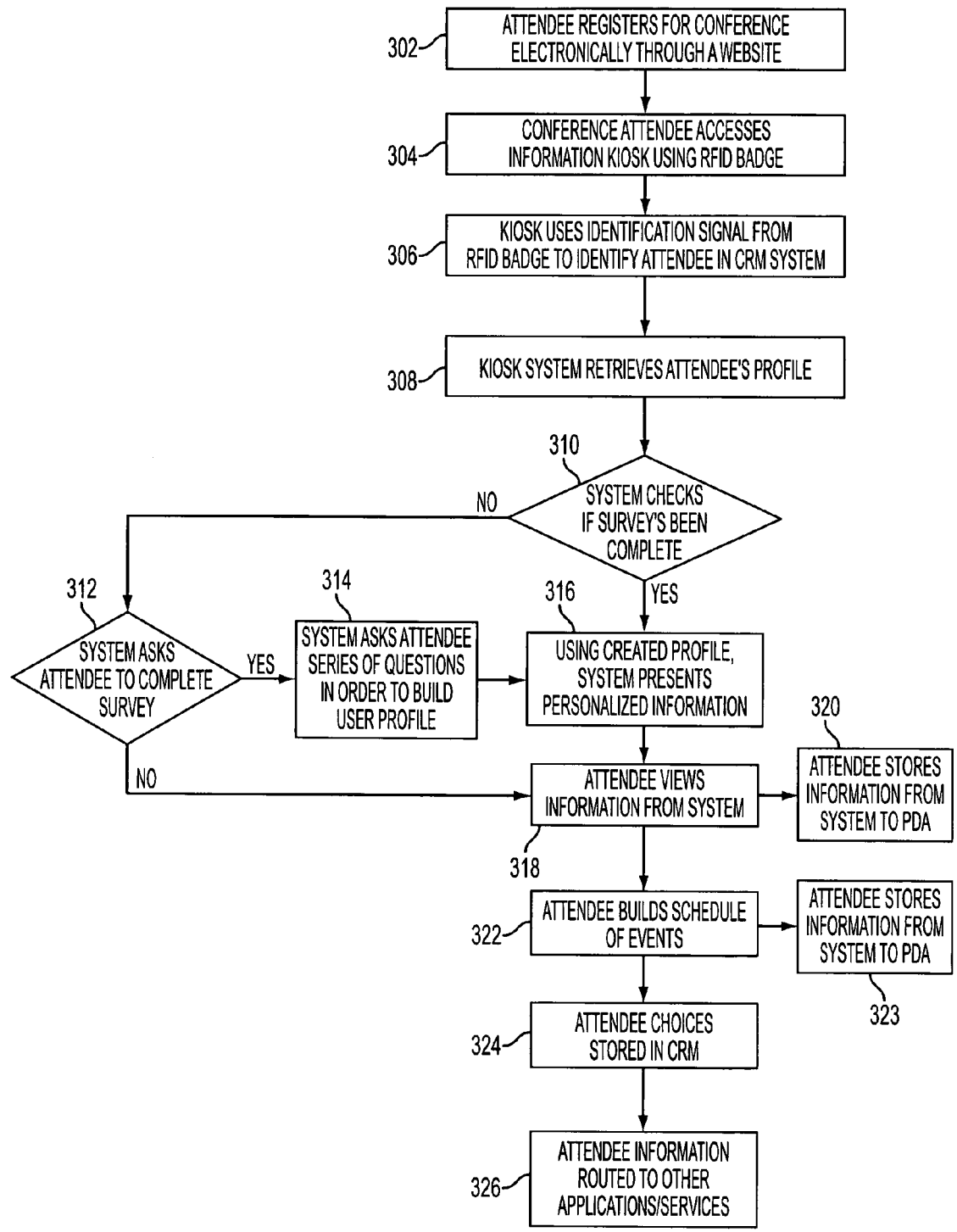
FIG. 3 is a flow chart illustrating user interaction with the information kiosk of FIG. 1.

In another implementation, shown in FIG. 3, attendees at an international sailing conference register for the conference electronically through a website (302). When attendees arrive, they receive a welcome packet with an RFID badge 140. The badge allows them entry into the conference facilities and may be used for various information services.

The conference includes two large exhibition halls, Hall A and Hall B, where vendors demonstrate and exhibit their products. Additionally, a wide variety of lectures, speeches, dinners, luncheons, classes, and demonstrations are scheduled each day. Conference attendees may peruse a printed guide included in their welcome packet; however, the guide may not be sufficient in identifying events of interest, building a schedule, or otherwise personalizing the conference for the attendee.

Using an RFID badge 140 (304), a conference attendee may access one or more information kiosks 100 located throughout the conference facilities. For example, a professional sailor interested in large sailboats may find it difficult to wade through the hundreds of vendor displays and talks to find those most interesting to him. The attendee may access a kiosk using the RFID badge 140 to efficiently locate those displays and/or events that have the highest personal relevance or interest.

The kiosk 100 receives an identification signal from the RFID badge 140 and uses the identification signal to identify the attendee in the CRM backend system 200 (306). The system retrieves the user's (attendee's) profile (308), and checks to see if any surveys have been completed to better personalize the experience for the attendee (310). If no surveys have been completed, the system asks the attendee whether he would like to complete a survey at this time (312). The attendee may select "yes" or "no" by using the touch screen display 110, or alternatively by speaking these responses for interpretation by the voice recognition system within the voice portal 230.

If the attendee desires to complete a survey, the system may ask a series of questions, to build a user profile (314). For example, the system may use conventional expert system techniques to classify the attendee in one or more categories. In this case, the system may determine that the participant is interested in sailboat racing and maxi yachts.

Using the created profile, the system may present personalized information (316). For example, the attendee may request a list of exhibitors. Based on his preferences, the kiosk 100 may display, for example, the maxi yacht exhibits and the racing exhibits before other relevant exhibits.

The attendee selects the exhibits he is interested in seeing (318), and the locations are highlighted on a map, which may be viewed or downloaded into a PDA (320). Next, the attendee may select talks and events. Again, the kiosk 100 may highlight the events most relevant to the attendee's interests based on his profile stored in the CRM backend system 200. The attendee may build a schedule (322) which can be viewed on the screen, or sent to the mobile device 150 using a communications method such as, for example, wireless, infrared, Bluetooth, SMS, or email. Optionally, the schedule information may be downloaded to and stored in a PDA (323), (e.g. the system may update a calendar in the user's PDA).

The attendee's choices are stored in the CRM backend system 200 (324) so that the attendee may later retrieve the data from a conference kiosk 100. Additionally, this updated information about the attendee's choices, along with information about the attendee, may be routed to other applications and/or services (326). For example, the attendee may not be able to see every display that they indicated as being of interest. The attendee's interest in a particular display or event may trigger the attendee's contact information to be forwarded by the CRM backend system 200 to the display's exhibitor so that the exhibitor may follow-up with the user in the future with additional information.

In the above-described implementations, an RFID activated kiosk is operable to access user information and compare this information to information that is specific to an event, such as a conference or tradeshow. In this way, the kiosk provides personalized information and/or a customized user interface to large numbers of users.

Of course such a system may be used in various other settings. For example, shoppers at a grocery store may be provided with a shopping list and directions through the store, based on their previous visits to the store. Similarly, the systems described herein may be implemented in any location or situation where people may benefit from having personalized information, such as, for example, airports, malls, amusement parks, or tourist sites.

A number of implementations have been described. Nevertheless, it will be understood that various modifications may be made. Accordingly, other implementations are within the scope of the following claims.

What is claimed is:

1. A method comprising:
   reading a radio frequency identification (RFID) tag associated with a user, using an RFID sensor integrated with an information kiosk that has access to situational information that includes information about a plurality of prospective sites;
   communicating with a Customer Relationship Management (CRM) system to obtain a user profile corresponding to the RFID tag;
   accessing the situational information that includes information about the plurality of prospective sites;
   executing a preselecting process operable to preselect for the user, a personalized subset of the prospective sites based on the user profile and the situational information, the preselecting process being executed by the CRM system;
   generating an interface providing a personalized user agenda for visiting the preselected personalized subset of prospective sites, based on the user profile, the situational information, and the preselected subset of prospective sites; and
   outputting the interface to provide the personalized user agenda to the user using the information kiosk.

2. The method of claim 1 wherein communicating with the Customer Relationship Management (CRM) system includes building the user profile by presenting a series of questions to the user via the kiosk.

3. The method of claim 1 wherein the user profiles in the Customer Relationship Management (CRM) system are uploaded from an attendee registration system.

4. The method of claim 1 wherein generating an interface providing a personalized user agenda for visiting the preselected personalized subset of prospective sites comprises building a user agenda providing directions and event descriptions that are customized to the user.

5. A method comprising:
   reading a radio frequency identification (RFID) tag associated with a user, using an RFID sensor integrated with an information kiosk;
   communicating with a Customer Relationship Management (CRM) system to obtain a user profile corresponding to the RFID tag;
   accessing situational information that includes information about a plurality of prospective sites;
   executing a preselecting process operable to preselect a personalized subset of the prospective sites for the user based on the user profile and the situational information, the preselecting process being execuuted by the CRM system;
   generating a personalized user agenda for visiting the preselected personalized subset of prospective sites, based on the user profile, the situational information, and the preselected subset of prospective sites; and
   outputting at least a portion of the personalized user agenda to a mobile device associated with the user.

6. The method of claim 5 wherein the mobile device is a mobile phone.

7. The method of claim 5 wherein the mobile device is a personal digital assistant (PDA).

8. The method of claim 1 wherein outputting the interface to provide the personalized user agenda comprises outputting a voice-enabled user interface.

9. A system comprising:
   an information kiosk including a display and having access to situational information that includes information about a plurality of prospective sites; and
   a radio frequency identification (RFID) sensor integrated with the information kiosk and operable to read an RFID tag associated with a user;
   a Customer Relationship Management (CRM) system that includes user profiles associated with users and is operable to preselect for the user a personalized subset of the prospective sites based on a user profile and situational information;
   wherein the information kiosk is operable to obtain the user profile associated with the RFID tag based on reading the RFID tag and communicating with the CRM system, and is further operable to use the CRM system to generate a personalized user agenda for visiting a preselected subset of the prospective sites, based on the situational information and the user profile and the preselected subset of prospective sites an output interface for presenting the personalized user agenda to the user.

10. The system of claim 9 wherein the display is a touch screen.

11. The system of claim 9 further comprising a customer relationship management (CRM) system operable to store the user profiles.

12. The system of claim 9 wherein the user profiles are built by presenting a series of questions to the user via the kiosk.

13. The system of claim 9 wherein the user profiles in the Customer Relationship Management (CRM) system are uploaded from an attendee registration system.

14. The system of claim 13 wherein the attendee registration system is implemented as a web-based application that allows users to register electronically on an internet.

15. The system of claim 9 wherein the information kiosk is operable to communicate with the Customer Relationship Management (CRM) system via a private exchange (PBX) switch.

16. The system of claim 15 wherein the information kiosk accesses the PBX switch in conjunction with accessing a contact information center (CIC).

17. The system of claim 15 wherein the information kiosk accesses the PBX switch in conjunction with accessing a voice portal operable to implement voice recognition.

18. The method of claim 1 wherein generating an interface providing a personalized user agenda includes receiving user inputs from the information kiosk and building the personalized user agenda based on the user inputs.

* * * * *